United States Patent [19]

Hostetler

[11] Patent Number: 4,621,776
[45] Date of Patent: Nov. 11, 1986

[54] ROUND BALE HANDLER

[75] Inventor: Dewey L. Hostetler, Harper, Kans.

[73] Assignee: DewEze Manufacturing, Inc., Harper, Kans.

[21] Appl. No.: 715,751

[22] Filed: Mar. 22, 1985

Related U.S. Application Data

[63] Continuation of Ser. No. 488,273, Apr. 25, 1983, abandoned.

[51] Int. Cl.⁴ .............................................. B02C 19/00
[52] U.S. Cl. ............................ 241/101.7; 241/101 A; 414/24.6
[58] Field of Search .................... 414/24.5, 24.6; 241/101.7, 101 A

[56]  References Cited

U.S. PATENT DOCUMENTS 4,232,986 11/1980 Johnson .............................. 414/24.5
4,249,842 2/1981 Johnson .............................. 414/24.5

FOREIGN PATENT DOCUMENTS 1065808 11/1979 Canada ................................ 414/24.5
2509570 1/1983 France ................................ 241/101.7

Primary Examiner—Howard N. Goldberg
Assistant Examiner—Joseph M. Gorski
Attorney, Agent, or Firm—Litman, Day and McMahon

[57]  ABSTRACT

A bale support arm is raised into the space between a bale trailer frame and the bale lift fork thereof to prevent a large round bale from sagging into that space, and possibly being damaged, during loading of the bale. Pairs of parallel frame links connected to the frame of the trailer and links connected to the fork are pivotally connected respectively to define hinge joints. In one embodiment of the invention for low-bed bale trailers, the bale support arm extends between the hinge joints. As the fork pivots upwardly, the arm is lifted as the links fold upwardly into the space between the fork and trailer and partially supports the tilting bale. In a second embodiment for high-bed bale trailers, a pair of arm lifting levers are connected to the hinge joints. The levers are connected by respective anchor links to the fork, and the bale support arm extends between the outer ends of the levers. As the hinge joints are raised, the levers are pivoted about their connections to the anchor links, and the bale support arm thereon is pivoted into the space between the fork and trailer to support the tilting bale.

10 Claims, 8 Drawing Figures

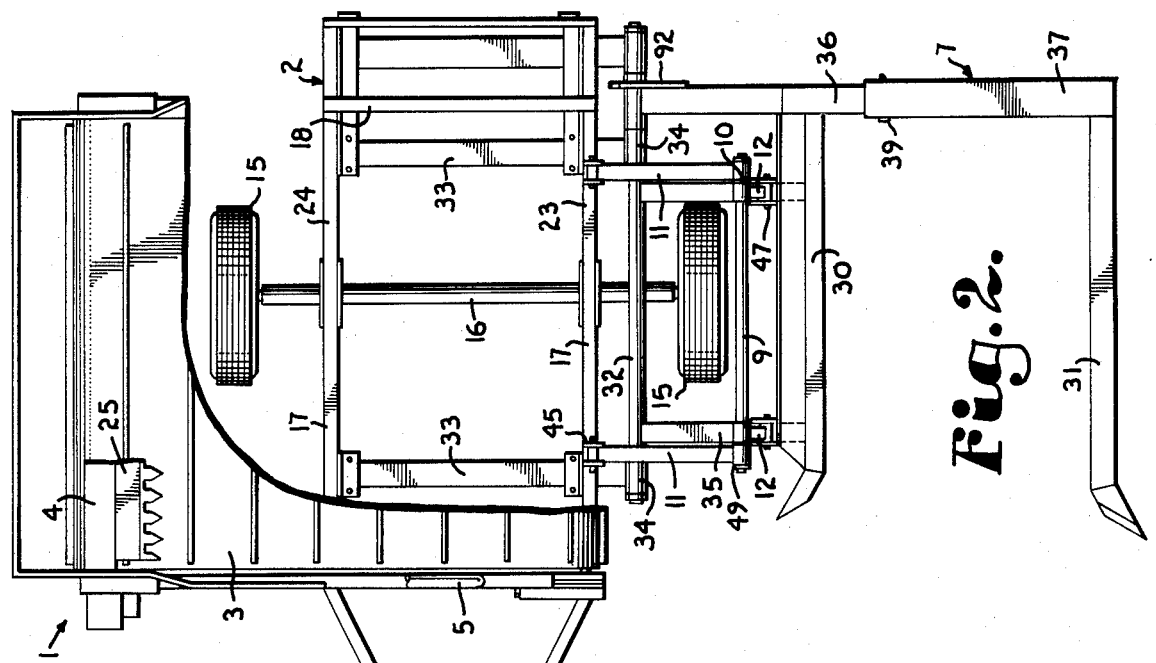
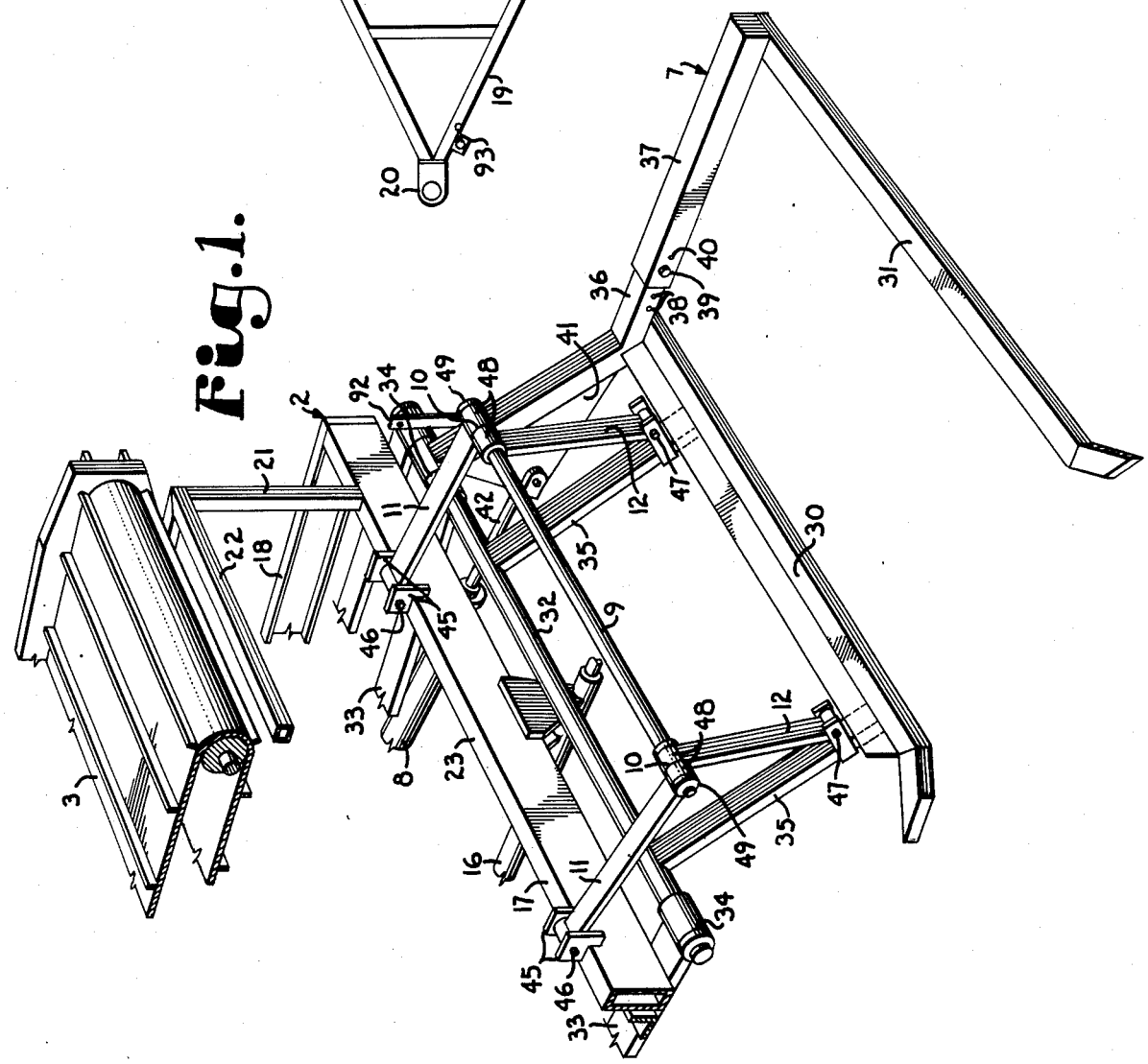

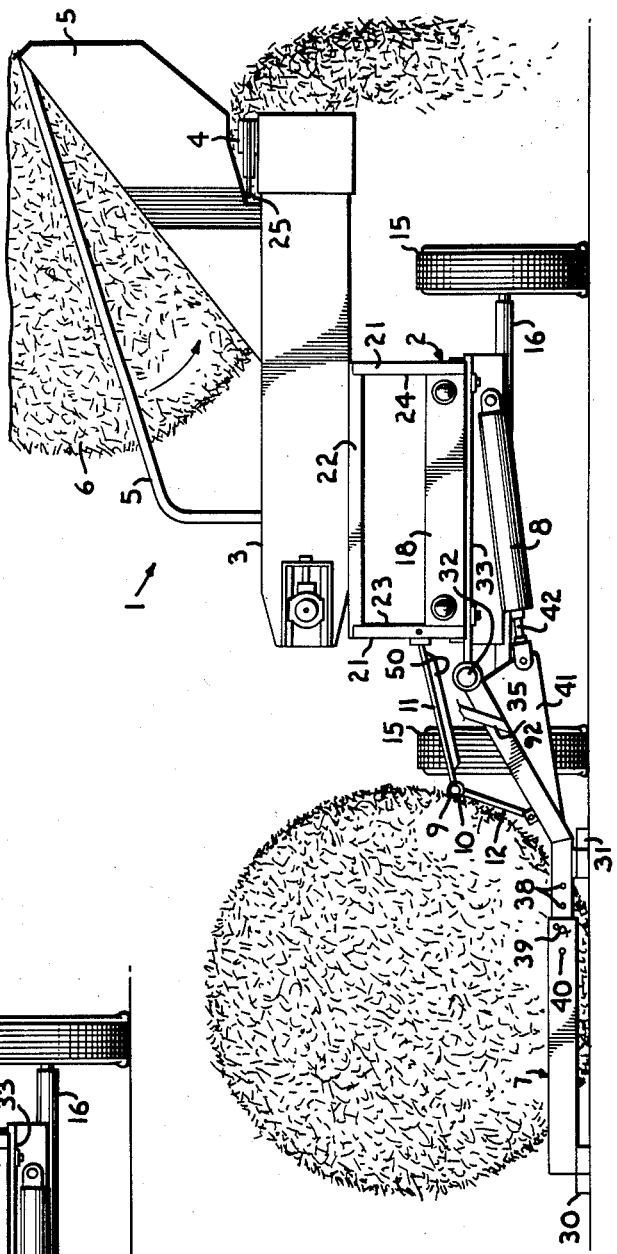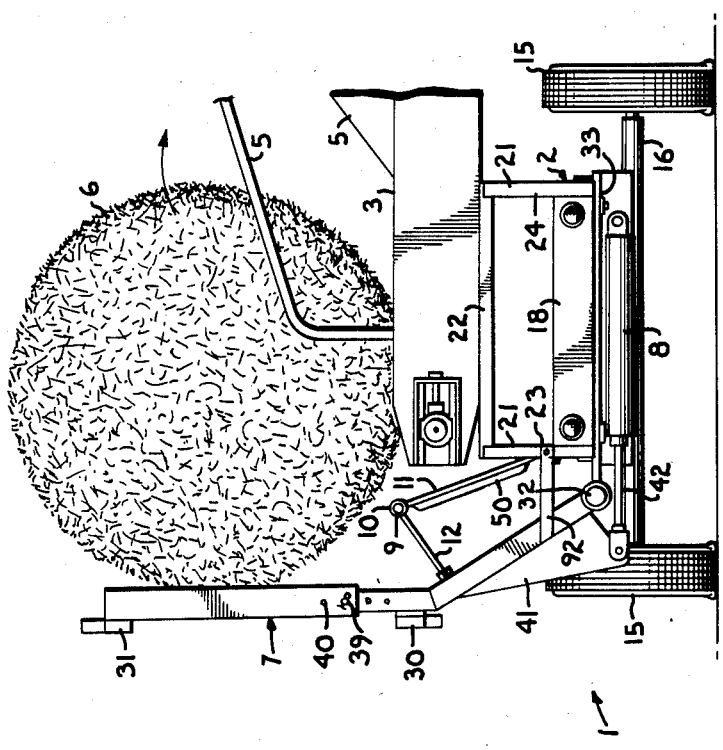

4,621,776

ROUND BALE HANDLER

CROSS-REFERENCE TO RELATED APPLICATIONS

The present application is a continuation of Ser. No. 488,273 on Round Bale Handler, filed Apr. 25, 1983, now abandoned.

FIELD OF THE INVENTION

The present invention relates to apparatus for handling large round bales and, more particularly, to such an apparatus including a bale support arm to bridging the space between an outset bald lifting fork and a conveyor on a trailer which is positioned at a height to provide for dispensing the hay into a raised feed trough.

BACKGROUND OF THE INVENTION

Cylindrical or round bales normally weigh about 1500 to 2000 pounds and have a size of about 5 or 6 feet in length and diameter. For this reason, specialized implements have been developed for lifting and carrying such bales and for dispensing the materials of such bales. Implements for lifting round bales include bale spikes, bale clamping arrangements, and various kinds of fork-lifts, most of the implements being motivated by hydraulic cylinders. Bale lifting implements have been provided as removable attachments to the front or rear or tractors and as permanent features of self loading bale handling trailers.

There are several methods of breaking down round bales for feeding the hay thereof to livestock. One method is to cut the bale cord and to manually unroll the bale on the ground. There are also machines for unrolling bales on the ground. Fruther dispersal of the hay is accomplished manually with hay forks. Another method employs bale shredders which often include rotating helical supports with angled teeth thereon which snag the hay and rip same from the bale, the hay then falling onto an auger which feeds the hay out onto the ground. One problem with helical shredders is that the geometric complexity of the structure increases the cost of manufacture.

Cattle are sometimes kept in lines of individual stalls or stanchions and fed from troughs which extend therealong. Such practice is common with dairy cattle to facilitate milking operations and for sanitary reasons. The outside rims of such troughs are sometimes raised to reduce waste of feed and for other reasons. The extra height required of an apparatus which fills such troughs poses some problems in designing such an apparatus, particularly if the apparatus is also required to load and carry bales. The problems include the complexity of the hay feeding device if the bale is maintained at a relatively low height during comminuting of the bale or the instability of the apparatus during travel and bale loading and possibly the complexity of the bale loading device itself if the bale is positioned relatively high to feed directly into the feed troughs.

The instability problems can be overcome to some extent by adapting the apparatus to be hitched to a three point hitch of a tractor. However, such a solution limits the utility of the bale handling apparatus.

SUMMARY OF THE INVENTION

The present invention provides a bale handling trailer capable of lifting, carrying, slicing, and feeding the hay of a bale into feed troughs of various heights. The trailer is a semi-trailer with the axis positioned to balance the carried bale slightly forward of the axle. The wheels of the trailer are spaced widely for lateral stability and to avoid the need for outriggers during bale loading. A bale lifting fork is spaced outwardly of one of the wheels in order to reach the height of the trailer bed and to maintain simplicity and economy in the structure. A laterally operating conveyor is provided on the trailer bed to assist in loading and unloading and to rotate the bale against a barrier on the trailer and into a sickle bar on a side of the trailer bed to slice a layer from the bale. The trailer is provided with a hitch for connection either to a tractor or a pickup truck for towing.

A bale support arm is connected between the fork and the trailer and is deployed to bridge the space therebetween as the bale is lifted, to prevent the bale from sagging into the space or being caught on the edge of the trailer bed. One form of the arm extends between a pair of hinges formed by the connection of pairs of links connected between the fork and the trailer frame. In another embodiment the arm extends between the ends of lever arms which are pivoted by the hinges as the fork is pivoted.

OBJECTS OF THE INVENTION

The principal objects of the present invention are: to provide an improved apparatus for manipulating large cylindrical bales; to provide such an apparatus for loading, carrying, and depositing a round bale and for slicing and dispensing a layer of the bale for feeding stock animals; to provide such an apparatus including generally a trailer frame, a laterally operating reversible conveyor, a bale lifting fork, and a slicer such as a sickle bar extending across the conveyor, the conveyor rotating the bale into the sickle bar to slice the bale, and a barrier around and above the sickle bar to prevent the bale from being rolled off the apparatus during rotation; to provide such an apparatus wherein the fork tines are forwardly directed for bale engagement during forward movement of the towing vehicle; to provide such an apparatus wherein the fork loads the bale by pivoting about a horizontal axis parallel to the longitudinal axis of the trailer; to provide a bale support arm for such an apparatus which is positioned beneath the bale during lifting to prevent parts of the bale from sagging into and being caught in the space between the fork and the trailer as the bale is pivoted and being damaged thereby; to provide such a support arm which is mechanically connected between the fork and trailer and is raised upon pivoting of the fork to lift the bale; to provide such a support arm which is adaptable to either low bed trailers or high bed trailers for filling feed troughs of comparable heights; to provide such an apparatus which may be hitched either to a trailer or a pickup truck for towing; and to provide such an apparatus which is economical to manufacture, positive and durable in operation, and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a fragmentary perspective view of a bale handler embodying the present invention.

FIG. 2 is a top plan view of the bale handler with portions broken away to illustrate details of the trailer frame.

FIG. 3 is a fragmentary rear elevational view of the bale handler with the fork assembly shown in an extreme upward position.

FIG. 4 is a view similar to FIG. 3 and illustrates one bale being sliced and a second bale engaged by the fork assembly.

FIG. 5 is a side elevational view of the bale handler.

DETAILED DESCRIPTION OF THE PREFERRED EMBODIMENT

Figure 7:
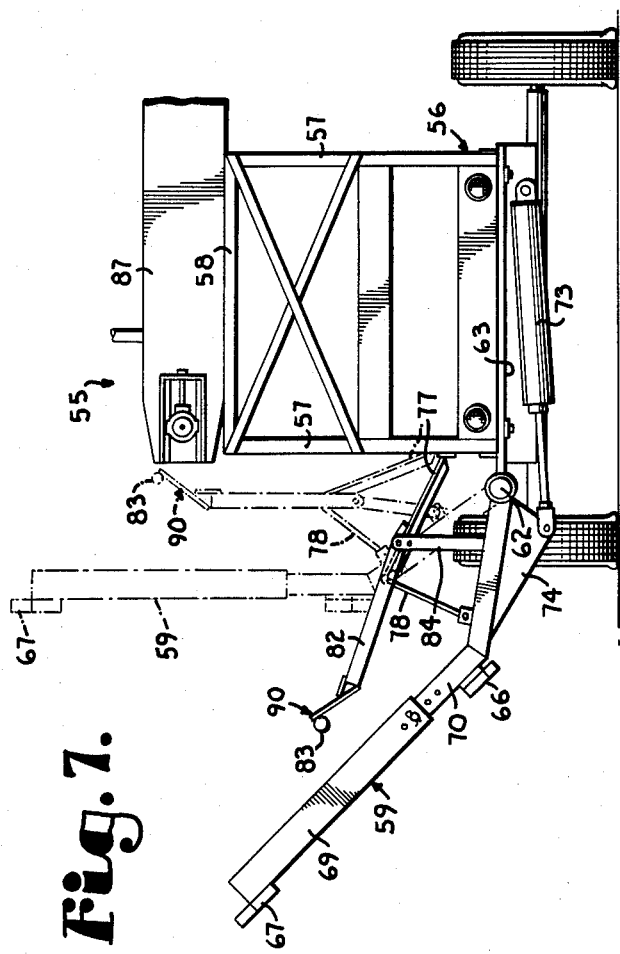
FIG. 7 is a fragmentary rear elevational view of the modified bale handler and illustrates the fork assembly in a partially raised position in full lines and in a fully raised position in phantom.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates a bale handling trailer according to the present invention. The trailer 1 includes a trailer frame 2 having a bale conveyor 3 positioned thereon and defining a bed of the trailer. A slicing mechanism 4 extends along one side edge of the trailer and in cooperation with the conveyor 3 and a bale barrier 5 is operative to slice an outer layer from a bale 6 for distribution of the material thereof. A bale lifting fork 7 is pivotally connected to a side of the trailer opposite the slicing mechanism 4. A hydraulic cylinder 8 is connected between the trailer frame 2 and fork 7 and is operable to pivot the fork to load the bale 6 onto the conveyor 3. In order to prevent damage to the bale 6 during lifting by sagging of the bale into the space between the trailer and fork, a bale support arm 9 is provided. The arm 9 extends between pairs of hinges 10 defined by the connection of pairs of frame links 11 connected to the trailer frame 2 and fork links 12 connected to the fork 7. As the fork is pivoted to lift the bale 6, the arm 9 is raised into the space between the fork and the trailer to engage the bale and thereby bridge the space between the fork and trailer during lifting.

The trailer frame 2 is preferably a semi-trailer frame having a pair of ground engaging wheels 15 on an axis 16 which is positioned to properly balance the loaded trailer for towing. As illustrated in FIG. 2, the axle 16 is positioned to balance a bale slightly forward thereof in order to apply some of the weight of the bale to the rear wheels of the draft vehicle (not shown) to aid in tractin. Referring to FIGS. 2 and 4, the wheels 15 are spaced outwardly of the frame 2 to resist lateral tipping of the trailer during travel and bale loading. The illustrated frame 2 is defined by a pair of longitudinal side members 17 and a pair of transverse end members 18. A trailer tongue 19 extends forwardly of the frame 2 and is provided with a hitch member 20 for connecting the trailer 1 to a draft vehicle such as a tractor or pickup truck. Upstanding corner members 21 are provided to support an upper frame 22 on which the conveyor 3 is mounted. The conveyor 3 may be a belt conveyor with blades or cleats thereon to engage the bale or may be a chain type conveyor wherein a pair of chains are routed around spaced sprockets and have the bale gripping blades extending therebetween. The conveyor 3 is preferably driven by a rotary hydraulic motor (not shown) and is reversible to convey the bale 6 from a fork side 23 of the trailer frame 2 toward a slicer side 24 in one direction and toward the fork side 23 for unloading in an opposite direction of the conveyor 3.

The bale slicer mechanism 4 may be any type of cutting arrangement which is suitable for slicing a layer from the periphery of the bale 6 and is illustrated as a sickle bar 25 which is preferably hydraulically driven. The sickle bar 25 extends along the slicer side 24 of the trailer 1 and is spaced above the conveyor 3 to regulate the thickness of the sliced layer. The blades of the sickle bar 25 are directed toward the fork side 24 to engage a bale and are preferably tilted downwardly toward tangency with the engaged portion of the bale to more closely match the direction of the wrapped hay fibers to thereby reduce undesired shredding of the bale. The conveyor 3 and bale barrier 5 cooperate to rotate the bale 6 about its cylindrical axis and into the sickle bar 25 for slicing. Engagement of the bale with the barrier 5 prevents the bale from rolling off the trailer on the slicer side 24, and in reaction to the driving engagement of the conveyor with the bale, the bale is rotated. Bales may be sliced either in the direction that they were wrapped in or the opposite direction. Further, bales have been purposely loaded onto the trailer 1 for endwise engagement with the slicer 4 and have been sliced with satisfactory results.

The fork lift assembly 17 is connected to one of the sides of the trailer 1, preferably, the same side as the driver's side of the draft vehicle (not shown) for operator visibility. Also, it is preferred that the tines 30 and 31 of the fork 7 extend in the forward direction of the trailer 1 for bale engagement during forward movement of the draft vehicle. The illustrated fork 7 is connected to a fork pivoting shaft 32 which is pivotally mounted on the left side of the trailer 1 (as viewed from the rear) which defines the fork side of the trailer. A pair of shaft supports 33 extend between and are connected to the side members 17 of the trailer frame 2 and have bearing sleeves 34 at ends thereof. Spaced apart fork lifting arms 35 extend from the shaft 32 to one of the fork tines, for example tine 30.

The spacing between the tines 30 and 31 is preferably adjustable to accommodate non-standard sized bales and bales which have become deformed or partially unwound. A first tine end support arm 36 is connected to the shaft 32 and has a rear end of the tine 30 connected thereto. A second tine end support 37 has the other tine 31 connected thereto and telescopically receives an end of the first support arm 36 therein. The spacing between the tines is set by means such as sets of spaced apertures 38 in the arm 36 and a bolt 39 received in a set of apertures 40 in the arm 37 which are alignable with the apertures 38. Other tine spacing arrangements are contemplated including automatic spacing which occurs just prior to pivoting of the fork from its bale engaging position. The arm 36 is provided with a lever arm or gusset 41 to which the arm 42 of the hydraulic cylinder 8 is connected. Extension of the cylinder 8 causes pivoting of the fork assembly 7 toward the trailer frame 2 to thereby lift a bale. Conversely, retraction of the cylinder 8 pivots the fork assembly 7 down toward the bale engaging position.

The illustrated pair of frame links 11 are pivotally connected to the side member 17 on the fork side 23 of the trailer frame by means such as upstanding lugs 45 to define frame link pivots 46. The fork links 12 are connected to the fork lifting arms 35 in a similar manner to define fork link pivots 47. The pairs of links 11 and 12 are pivotally interconnected at the bale support arm 9 to define the hinges 10 by means of respective bearing sleeves 48. Each set of links 11 and 12 may be laterally offset as shown or may be in line, with one of the bearing sleeves on one link being narrowed and the other a clevis type of arrangement (not shown). The axial positions of the bearing sleeves 48 may be fixed by collars 49. The bale support arm 9 extends between the hinges 10 and adds to the strength of the link structure by maintaining parallelism of the links and helping to distribute forces applied thereto. The frame links 11 may be strengthened by ribs 50 welded to the undersides thereof.

As the fork assembly 7 is pivoted to lift a bale 6, the pairs of links 11 and 12 are folded together thereby lifting the bale support arm 9 upwardly into the space between the fork 7 and trailer frame 2. At a certain angular position of the forks 7, gravity causes the bale to roll away from the fork toward the trailer frame. As the bale rolls toward the frame 2, the arm 9 bridges the space between the fork and the frame to prevent the bale from sagging thereinto and becoming lodged therein. The trailer 1 is particularly well adapted for being towed by and used with a pickup truck. The relatively wide track of the wheels 15 and position of the conveyor 3 to substantially balance the weight of a bale on the axle 16 allows the use of a single point hitch such as the hitch 20. Because of the height of the conveyor 3 and the outwardly spaced wheel 15 on the fork side 23 of the trailer frame, it is also necessary to space the fork assembly 7 outwardly of the frame. It is the space between the raised trailer bed (conveyor 3) and the outrigged fork which is bridged by the bale support arm not only during loading, but also whenever it is desired to unload an unsliced bale by reversal of the conveyor 3 and pivoting of the fork 7 away from the trailer frame 2. While the bale handling trailer 1 is well suited for use with a pickup truck, it is no less suitable for use with a conventional tractor.

Figure 8:
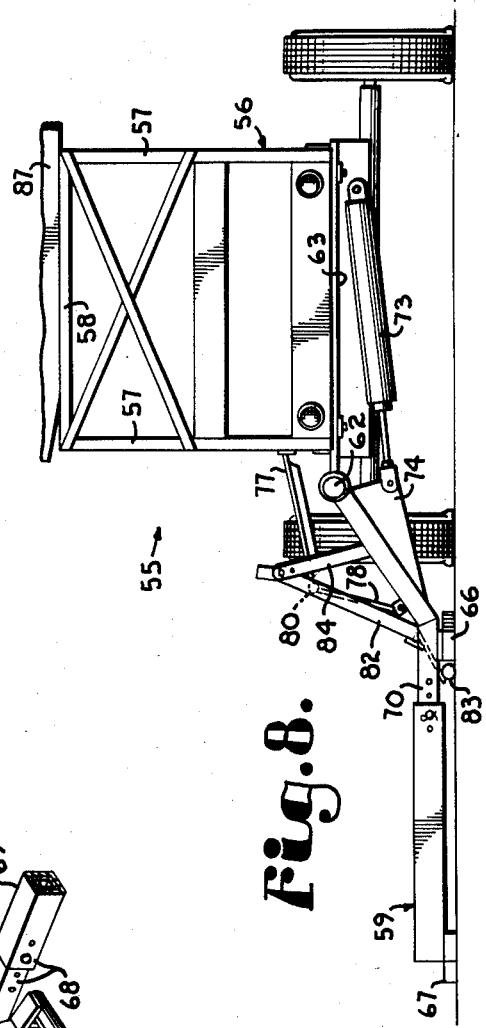
FIG. 8 is a view similar to FIG. 7 and illustrates the fork assembly in a lowered bale engaging position.
Figure 6:
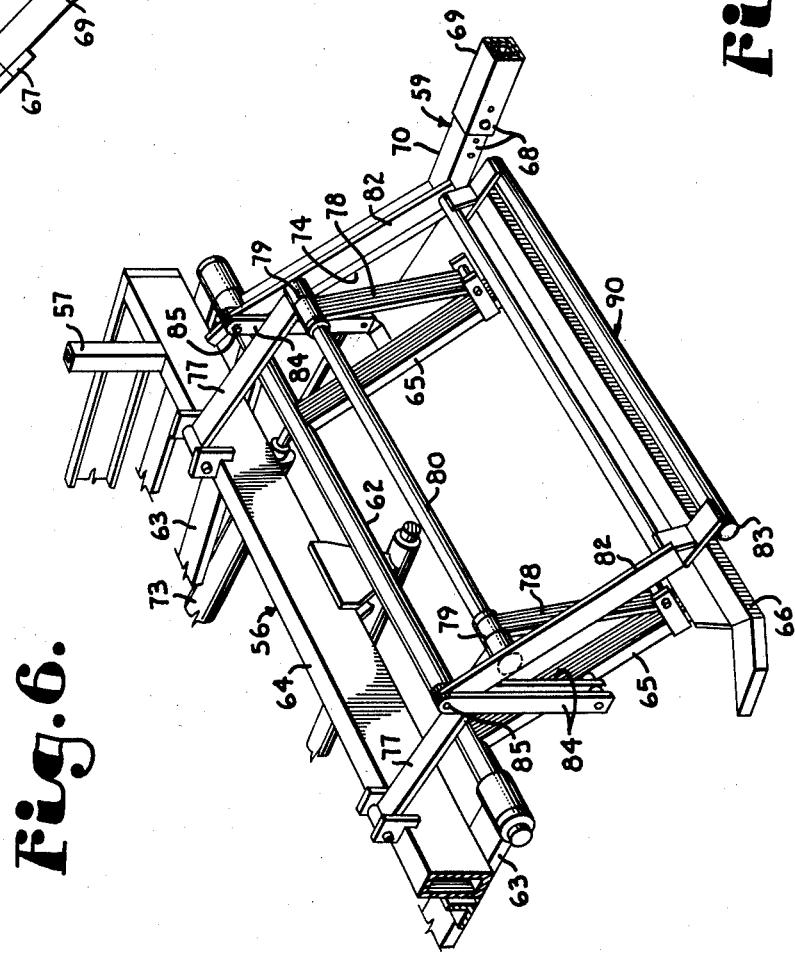
FIG. 6 is a view similar to FIG. 1 and illustrates a modified embodiment of the bale handler.

FIGS. 6-8 illustrate a modified embodiment 55 of the bale handling trailer according to the present invention. The trailer frame 56 of the modified trailer 55 is substantially the same as the frame 2 of the trailer 1 except that the upstanding corner members 57 of the frame 56 are taller than the corresponding corner members 21 of the frame 2 such that the upper frame 58 of the trailer frame 56 is positioned higher than the upper frame 22 of the trailer 1. The purpose of this is to accommodate feed troughs (not shown) having a higher rim than can be fed by the bale handling trailer 1.

The bale lift assembly 59 resembles the fork assembly 7 in many respects and includes a pivot shaft 62 pivotally mounted on shaft supports 63 to one of the side members 64 of the frame 56. Fork lifting arms 65 extend radially from the shaft 62 and terminate in a first fork tine 56. The lift assembly 59 includes a second fork tine 67 which extends from a tine end support 68. The end support 68 may include extendible outer and inner portions 69 and 70 similar to the telescoping end supports 36 and 37 of the trailer 1 and may be fixed for a selected tine spacing in a similar manner. An inner end of the support 70 is connected to the fork pivot shaft 62. The bale lift assembly 59 is pivoted by a hydraulic cylinder 73 connected to the frame 56 at one end and to a lever or gusset 74 at the other end.

A pair of frame links 77 are pivotally connected to one of the side members 64, and a pair of fork links 78 are pivotally connected to the fork lifting arm 75. The pairs of links 77 and 78 meet respectively and are hingedly connected to define hinge joints 79 which may include a hinge connector brace 80 similar to the bale support arm 9 of the trailer 1. The hinge joints 79 are connected respectively to a pair of levers 82 which have a bale lift arm 83 connected between outward ends thereof. The inner ends of the levers 82 are connected by anchor links 84 to the fork lifting arms 65.

In the bale engaging position of the assembly 59, the bale lift arm 83 is positioned just inside the fork tine 66. Upon pivoting of the assembly 59, the hinge joints 79 are lifted in the same manner as the hinges 10 on the trailer 1. The lifting motion of the hinge joints 79 is transferred to the arms 82 thereby pivoting same about fulcrum joints 85 defined by the connection of the arms 82 to the anchor links 84. As the shaft 62 continues to pivot, the arm 83 is pivoted ahead of the inner fork tine 66 and is maintained in a roughly constant spaced relation to the outer fork tine 67. If the bale lift assembly 59 has been positioned about a bale 6 prior to pivoting, the bale is engaged by the outer tine 67 and the bale lift arm 83 for lifting and depositing of the bale on a conveyor 87 positioned on the upper frame 58 of the trailer frame 56. At the point of deposit, the bale is rolled over the arm 83 onto the conveyor 87. During the early portion of the lifting cycle, the bale is prevented from falling into the space between the arm 83 and the trailer frame 56 by the rotation of the bale about its axis away from the trailer as the bale as a whole is revolved toward the trailer due to the different rates of pivoting of the outer tine 67 and bale lift arm 83. In addition, the bale 6 is gripped slightly between the tine 67 and arm 83 during the early and middle stages of lifting due to a slight motion of the arm 83 relative to the tine 67.

It would be possible to omit the inner fork tine 66 from the assembly 59 and configure the bale lift arm 83 as a fork tine similar to the tine 66. In such a case, it might be desirable to provide a brace (not shown) between the ends of the bale lifting arms 65 for rigidity. However, in the form illustrated in FIGS. 6-8, the inner arm assembly 90 including the anchor links 84, the lever arms 82, the bale lift arm 83, and suitable connectors in addition to extended corner members 57 may be provided as an add-on kit for the trailer 1 should a cattleman need to convert from the low bed dispensing of the trailer 1 to the high bed dispensing provided by a trailer such as the trailer 55.

In the transportation of a single bale 6 on the trailer 1 or 55, the fork assembly 7 or bale lift assembly 59 is pivoted to the upward position and may be mechanically fixed there by a transport safety link 92 extending between one of the respective tine end supports and the trailer frame. The respective conveyor 3 or 87 is operated to position the bale 6 on the approximate longitudinal center line of the trailer to laterally balance same. It is also possible to carry two bales on the trailers 1 and 55 by placing one bale on the respective conveyor and holding a second bale on the respective bale lift mechanism in a trailer laterally balancing position. The trailers 1 and 55 may slice and dispense a first bale while holding a second bale clear of the respective conveyor. The trailers 1 and 55 are preferably provided with means such as a jack 93 on the respective tongue thereof for unhitched parking purposes.

While the bale handling arrangement of the present invention has been disclosed primarily in terms of a bale handling trailer, it is not essential that the arrangement be trailer. Additionally, the frame supporting the fork, conveyor, and slicer could be a frame of a self-propelled vehicle such as a truck or could even be a stationary frame wherein the bales are fed to the fork by a first conveyor and the sliced layer fed onto a second conveyor (not shown). Further, the bale life device could be some arrangement other than a fork lift.

It is to be understood that while certain forms of the present invention have been illustrated and described herein, it is not to be limited to the specific forms or arrangement of parts described and shown.

What is claimed and desired to be secured by Letters Patent is as follows:

1. A bale handler for manipulating large cylindrical bales, the bale handler comprising:
   (a) a bale support frame for supporting a large cylindrical bale of bale material, said frame having a front end, a rear end, and opposite left and right laterally spaced sides;
   (b) axle means for supporting ground engaging wheels, said axle means having a longitudinal axis that is aligned generally perpendicularly to said sides of said frame connected at a position between said front and, and said axle means being connected to said frame at a position that is located between said front and rear ends in order to support a bale generally above said axle means;
   (c) a rotatable ground engaging wheel positioned on said axle means on each of said opposite sides of said frame, each wheel being spaced substantially outwardly from its respective side of said frame in order to resist lateral tipping of said handler;
   (d) a bale lift device on one of said sides, said bale lift device being pivotally connected to said frame by a lift device pivotal connection so as to pivot about a generally horizontal pivot axis which is generally aligned parallel to said one of said sides, so that said lift device engages said bale and lifts same onto said frame, said lift device being positioned to operate substantially across one of said wheels in order to resist said tipping during operation of said lift device;
   (e) a motor connected between said frame and said bale lift device and operable to pivot said lift device to lift said bale; and
   (f) a bale support arm extending parallel to and spaced from said pivot axis, said bale support arm being pivotally connected to said frame by a frame link and being pivotally connected to said bale lift device by a lift link, said frame link and said lift link each having a hinge end, the hinge ends being connected to each other, the hinge ends also cooperating with each other and with said bale support arm so as to form a hinge joint associated with said bale support arm, said hinge joint and said bale support arm being pivoted in a generally upward direction upon pivoting of said lift device to lift a bale, said bale support arm being positioned between portions of said bale lift device and said frame, so that said bale support arm raises, and engages said bale during lifting in order to prevent said bale from sagging between said bale lift device and said frame during said lifting.

2. A bale handler as set forth in claim 1 including:
   (a) a reversible bale conveyor on said frame for movement of said bale onto said frame.

3. A bale handler as set forth in claim 1 including:
   (a) a bale slicer positioned at an edge of said frame for slicing a layer of said bale for dispensing material constituting said bale;
   (b) a bale conveyor positioned on said frame for receiving said bale from said bale lift device and for conveying said bale toward said slicer, said conveyor cooperating with said slicer to slice said layer and dispense same from said bale support frame by effecting rotation of said bale, said conveyor unloading said bale from said frame by operation of said conveyor in a reverse direction; and
   (c) a bale barrier on said frame at said edge, said barrier cooperating with said conveyor to rotate said bale and prevent said bale from rolling off said frame during rotation.

4. A bale handler as set forth in claim 3 wherein:
   (a) said slicer is a sickle bar.

5. A bale handler as set forth in claim 1 wherein:
   (a) said lift device is mounted on a first lateral side of said sides;
   (b) a bale slicer is positioned on an opposite second lateral side of said sides and is operative to slice a layer of material from said bale for dispensing material constituting said bale;
   (c) a bale conveyor is positioned on said frame for receiving said bale from said lift device and for conveying said bale from said first side to said second side for engagement with said slicer, and also for rotating said bale such that said slicer slices a layer of material from said bale and feeds said layer off said frame; and
   (d) a bale barrier is positioned on said second side of said frame, said barrier being engaged by said bale during rotation of said bale to prevent said bale from rolling off said frame.

6. A bale handler as set forth in claim 1 wherein:
   (a) said frame line, said lift link, and said hinge joint are respectively a first frame link, a first lift link, and a first hinge joint, and define a first hinge lift assembly;
   (b) said bale handler includes a second frame line, a second lift link, and a second hinge joint, said second frame line, said second lift link, and said second hinge joint defining a second hinge lift assembly that is constructed and functions similar to said first hinge lift assembly and is spaced from said first hinge lift assembly; and
   (c) said bale support arm is connected to said first and second hinge joints.

7. A bale handler as set forth in claim 1 including:
   (a) an anchor link having one end pivotally connected to said lift device at a position along said lift link and spaced from the connection of said lift link to said lift device, said anchor link having an opposite end; and (b) a bale support arm lift lever having said bale support arm positioned at one end of said lever and having an opposite end pivotally connected to said opposite end of said anchor link to define a bale support arm fulcrum joint, said lever being pivotally connected to said hinge joint at a position that is spaced from said opposite end of said lever, whereby upon said hinge joint being raised in response to the pivoting of said lift device, said hinge joint pivots said lever about said fulcrum joint to thereby raise said bale support arm into said space between said portions of said lift device and said frame.

8. A bale handler as set forth in claim 7 wherein:
   (a) said frame link, said lift link, and said hinge joint are respectively a first frame link, a first lift link, and a first hinge joint, and define a first hinge lift assembly;
   (b) said bale handler includes a second frame link, a second lift link, and a second hinge joint, said second frame link, said second lift link, and said second hinge joint defining a second hinge lift assembly that is constructed and functions similar to said first hinge lift assembly and is spaced from said first hinge lift assembly;
   (c) said anchor link and said arm lift lever are respectively a first anchor link and a first arm lift lever and define a first bale support arm lift assembly;
   (d) said bale handler includes a second anchor link and a second arm lift lever, said second anchor link and said second arm lift lever defining a second bale support arm lift assembly that is constructed and functions similar to said first lift assembly and is spaced from said first lift assembly; and
   (e) said bale support arm is connected to free ends of said first and second arm lift levers.

9. A bale handler as set forth in claim 1 wherein:
   (a) said bale support frame is a frame of a vehicle; and
   (b) said bale lift device is a bale lift fork.

10. A bale handler for manipulating large cylindrical bales, the bale handler comprising:
   (a) a trailer for supporting a large cylindrical bale of bale material and having a hitch for connecting said trailer to a draft vehicle, said trailer having a front end, a rear end, a loading side and an opposite slicer side;
   (b) said trailer having axle means positioned on said trailer to support a bale, said axle means supporting a ground engaging wheel on each of opposite sides of said trailer, each wheel being spaced substantially outwardly from its respective side of said trailer for lateral stability;
   (c) a bale slicer positioned on the slicer side for slicing a layer of a bale for distribution of said bale material;
   (d) a reversible bale conveyor positioned on said trailer and operative to move a bale from said loading side toward said slicer side to engage said slicer, said conveyor cooperating with said slicer to slice said layer and dispense same from said trailer by effecting rotation of said bale, said conveyor unloading said bale from said trailer by operation of said conveyor in a reverse direction;
   (e) a bale barrier on said slicer side, said barrier cooperating with said conveyor to rotate said bale and prevent said bale from rolling off said slicer side during said rotation,
   (f) a bale lift fork pivotally connected to said loading side for pivoting about a pivot axis that is generally parallel to a direction of travel of said trailer, in order to engage a bale that is on the ground and lift same onto said conveyor, said fork being positioned to operate substantially across one of said wheels;
   (g) a linear motor connected between said fork and said trailer and operable to effect movement of said fork to lift said bale;
   (h) a frame link having a frame end that is pivotally connected to said frame, and also having an opposite first hinge end;
   (i) a fork link having a fork end that is pivotally connected to said fork, and also having an opposite second hinge end;
   (j) said first hinge end and second hinge end being pivotally connected to each other to define a hinge joint which is pivoted in a generally upward direction upon the pivoting of said fork to lift a bale; and
   (k) a bale support arm extending parallel to said pivot axis, being connected to said hinge joint, and being raised between portions of said fork and said trailer upon said fork pivoting, so that said bale support arm lifts a bale to prevent said bale from sagging between said portions of said fork and said trailer during the lifting of said bale.

* * * * *